/ Patented Feb. 18, 1947

2,415,897

UNITED STATES PATENT OFFICE 2,415,897

BARBITURIC COMPOUNDS

Samuel M. McElvain and Howard Burkett, Madison, Wis.

No Drawing. Application April 8, 1942, Serial No. 438,122

8 Claims. (Cl. 260—257)

This invention relates to barbituric compounds and more particularly to 5-(1-ethoxyethyl)-5-alkyl barbituric compounds.

The compositions of this invention are represented by the following formula:

(1) 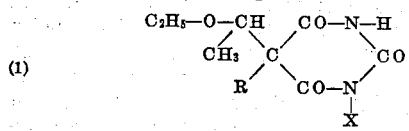

in which R is an alkyl radical having more than 2 and less than 6 carbon atoms and X is hydrogen (if the compound is an acid) or (if the compound is a salt) an alkali metal such as sodium, an equivalent of an alkaline-earth metal such as calcium, or ammonium or a substituted ammonium such as monoalkyl ammonium, for example $NH_3CH_3$, dialkyl ammonium, for example $NH_2(C_2H_5)_2$, and alkanol ammonium, for example $NH_3CH_2CH_2OH$.

Salts of this invention are found to have unexpected properties. On parenteral administration they are definitely sedative and anesthetic in their physiological action and do not cause convulsions or tremors when administered intraperitoneally in rats. These properties are the more remarkable in the light of the untoward reactions of the homologues of the compositions of this invention. For example, the salts of 5-(1-ethoxyethyl)-5-ethyl barbituric acid and 5-(1-n-propoxyethyl)-5-(1-methylbutyl) barbituric acid produce tremors, while the salts of 5-(1-n-propoxyethyl)-5-ethyl barbituric acid and 5-(1-n-butoxyethyl)-5-ethyl barbituric acid cause convulsions. Some of the compositions of this invention, for example, sodium 5-(1-ethoxyethyl)-5-n-propyl barbiturate, have excellent analgesic properties.

The compositions of this invention are prepared by any one of the following methods:

A quantity of ketene diethyl acetal is reacted with approximately one half its molecular equivalent of a dialkyl malonate and preferably diethyl malonate [$CH_2(COOC_2H_5)_2$]. The reactants are thoroughly mixed with a suitable catalyst, such as sodium ethoxide, and heated at between 125°–150° C. for about 12 hours. During this time a mixture of dialkyl (1-ethoxyethylidene)-malonate and dialkyl (1-ethoxyvinyl)-malonate is formed. The reaction which takes place when the dialkyl malonate is diethyl malonate may be represented by the following equation:

(2) 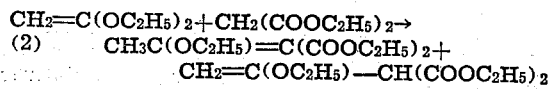

The dialkyl (1-ethoxyethylidene)-malonate and the dialkyl (1-ethoxyvinyl)-malonate may be separated from each other by any suitable means, such as distillation or crystallization. However, it is not necessary to separate them. Either the dialkyl (1-ethoxyethylidene)-malonate or the dialkyl (1-ethoxyvinyl)-malonate or a mixture of these two compositions may be alkylated by reacting the composition or the mixture with the required alkyl halide in the presence of an alkali alkoxide, such as sodium isopropoxide, sodium ethoxide, or sodium tertiary butoxide. The alkyl halide, preferably the alkyl bromide, is reacted with the dialkyl (1-ethoxyethylidene)-malonate or with the dialkyl (1-ethoxyvinyl)-malonate, or with a mixture of the two in the presence of the alkali alkoxide. The alkylation may be conveniently performed by preparing a solution of the alkali alkoxide from about 0.1 mol of sodium in approximately 15 times its weight of anhydrous solvent alcohol, such as ethyl or isopropyl alcohol. To the solution is added 0.1 mol of the dialkyl malonate. The alkyl halide, and preferably the alkyl bromide or iodide, is added to this alkaline solution and the mixture is refluxed until it is neutral. During this time dialkyl (1-ethoxyvinyl)-R-malonate is formed. After cooling, sufficient water is added to dissolve all of the salt. The oily layer, which contains the dialkyl (1-ethoxyvinyl)-R-malonate, separates. The aqueous layer may be extracted with a suitable solvent, such as ether, and the extract added to the oily layer.

The reaction which takes place in the alkylation when diethyl malonate is the starting material may be represented by the following equation:

(3) 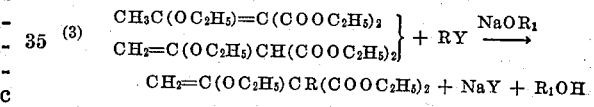

in which R has the same meaning as heretofore defined, Y is a halogen and $R_1$ is a lower alkyl group.

The dialkyl (1-ethoxyvinyl)-R-malonate may be converted by condensation with urea to the corresponding barbituric acid and that 5-(1-ethoxyvinyl)-5-R-barbituric acid may be hydrogenated to form 5-(1-ethoxyethyl)-5-R-barbituric acid; or alternately the dialkyl (1-ethoxyvinyl)-R-malonate may be hydrogenated to form the dialkyl (1-ethoxyethyl)-R-malonate and this latter malonic ester converted by condensation with urea to the corresponding barbituric acid.

To produce the 5-(1-ethoxyethyl)-5-R-barbituric acid by converting the dialkyl (1-ethoxyvinyl)-R-malonate first to the 5-(1-ethoxyvinyl)-5-R-barbituric acid, the procedure is as follows:

To an alcoholic solution of sodium ethoxide prepared from 0.2 mol of sodium with about 15 times its weight of absolute ethyl alcohol are added about 0.125 mol of urea and about 0.07 mol of the dialkyl (1-ethoxyvinyl)-R-malonate. The mixture is refluxed about 12 hours, the alcohol removed by distillation and the residue dissolved in ice water. The aqueous solution is then extracted with a suitable solvent, such as ether. The water layer contains sodium 5-(1-ethoxyvinyl)-5-R-barbiturate. The sodium 5-(1-ethoxyvinyl)-5-R-barbiturate is converted to the corresponding barbituric acid by acidification with a suitable mineral acid, such as hydrochloric acid. The 5-(1-ethoxyvinyl)-5-R-barbituric acid is separated by any suitable means, such as filtration, and is then dissolved in a solvent, such as alcohol. The solution is agitated in the presence of a suitable catalyst, such as Raney nickel, with hydrogen and the 5-(1-ethoxyvinyl)-5-R-barbituric acid is converted to 5-(1-ethoxyethyl)-5-R-barbituric acid.

To prepare the 5-(1-ethoxyethyl)-5-R-barbituric acid from the dialkyl (1-ethoxyethyl)-R-malonate, the dialkyl (1-ethoxyvinyl)-R-malonate is first converted into dialkyl (1-ethoxyethyl)-R-malonate. This conversion is achieved by agitating a solution of dialkyl (1-ethoxyvinyl)-R-malonate with hydrogen in the presence of a suitable catalyst, such as Raney nickel. The dialkyl (1-ethoxyethyl)-R-malonate is then reacted with urea in the presence of an alkali alkoxide, such as sodium ethoxide, to produce 5-(1-ethoxyethyl)-5-R-barbituric acid.

Another method of preparing the compositions of this invention is to react α-chlorodiethyl ether with the sodio-derivatives of dialkyl R-malonates to form dialkyl (1-ethoxyethyl)-R-malonates. The dialkyl (1-ethoxyethyl)-R-malonates are then condensed with urea to form 5-(1-ethoxyethyl)-5-R-barbituric acids.

The procedure for obtaining dialkyl (1-ethoxyethyl)-R-malonates from the sodio-derivatives of dialkyl R-malonates and α-chlorodiethyl ether is as follows:

Five-tenths mol of a dialkyl R-malonate is added to about 0.55 mol of sodium reacted with liquid ammonia. The mixture is agitated and a quantity of a suitable solvent, such as a mixture of dry ether and dry benzene, added. A less desirable, although still feasible method of preparing the sodio-derivative of the dialkyl R-malonate is by reacting, in an inert solvent, such as ether or benzene, the metallic sodium and the dialkyl R-malonate. Any liquid ammonia present is permitted to evaporate off and after the ammonia has been removed, 0.7 mol of α-chlorodiethyl ether is added. The reaction mixture is then agitated for a period of approximately one hour at room temperature and about 10 minutes at the refluxing temperature of the solvent. The reaction mixture is then cooled and water added. The solvent layer is separated and washed with water. During this time the dialkyl (1-ethoxyethyl)-R-malonate is formed which is isolated by fractional distillation. The dialkyl (1-ethoxyethyl)-R-malonate may be converted to the corresponding barbituric acid by condensation with urea in the manner as heretofore described.

Typical examples of the preparation of the compositions of this invention are as follows:

Example 1.—Preparation of 5-(1-ethoxyethyl)-5-(1-methylbutyl) barbituric acid

Diethyl (1-ethoxyethyl)-(1-methylbutyl)-malonate is first prepared.

Three-tenths gram of hydrated ferric chloride is placed in a dry one-liter 3-necked flask equipped with an inlet tube, stirrer, and reflux condenser connected to a soda-lime drying tower, which in turn is connected to a gas trap. The flask is cooled in a dry ice-acetone bath and 300 ml. of liquid ammonia is added. The stirrer is started, the cooling bath removed, and a small piece of sodium added. As soon as the initial blue color disappears, 12.7 g. (0.55 mol) of sodium in small pieces is rapidly added. When all of the sodium is reacted as indicated by the disappearance of the blue color, the cooling bath is replaced and 115 g. (0.5 mol) of diethyl (1-methylbutyl)-malonate is added from a separatory funnel in a small stream. The reaction mixture is stirred for 15 minutes in the cooling bath and for 15 minutes out of the cooling bath. Then 50 ml. of dry diethyl ether and 300 ml. of dry benzene are added in a small stream. After the reaction mixture reaches room temperature, it is refluxed on a steam bath until all of the ammonia is removed. To facilitate the removal, a small stream of dry nitrogen is passed into the flask. When all of the ammonia is removed, the flask is cooled with cold water and 76 g. (0.7 mol) of α-chlorodiethyl ether is added dropwise. After the addition of the α-chlorodiethyl ether, stirring is continued for about one hour at room temperature and for about 10 minutes at the refluxing temperature of the benzene. The reaction mixture is then cooled, and 300 ml. of water is added. The benzene layer is separated and washed with two 100 ml. portions of water. The combined aqueous portions are extracted with ether. The benzene layer is combined with the ether extract, washed with 50 ml. of 10 percent sodium carbonate solution, dried over anhydrous sodium carbonate, and finally distilled. The boiling point of the diethyl (1-ethoxyethyl)-(1-methylbutyl)-malonate is 83°–84° C. at 0.03 mm. pressure.

To a solution of a 3.5 g. (0.15 mol) of sodium in 50 ml. of absolute ethyl alcohol is added 6 g. (0.10 mol) of urea and 15.1 g. (0.05 mol) of diethyl (1-ethoxyethyl)-(1-methylbutyl)-malonate. After the mixture is refluxed 18 hours, the alcohol is removed by distillation. About 100 ml. of ice water is added to the residue. The resulting solution is extracted with 75 ml. of ether in three portions. To the water solution is added an excess of concentrated hydrochloric acid. The 5-(1-ethoxyethyl)-5-(1-methylbutyl) barbituric acid precipitates and may be recrystallized from 50 percent ethyl alcohol. After three recrystallizations from 50 percent alcohol the melting point of the 5-(1-ethoxyethyl)5-(1-methylbutyl) barbituric acid is about 169°–169.5° C., uncorrected.

Example 2.—Preparation of 5-(1-ethoxyethyl)-5-n-butyl barbituric acid

The 5-(1-ethoxyethyl)-5-n-butyl barbituric acid is prepared in the same manner as in Example 1, except that instead of employing 115 g. of diethyl (1-methylbutyl)-malonate, 108 g. (0.5 mol) of diethyl n-butyl-malonate is used. The boiling point of the diethyl (1-ethoxyethyl)-n-butyl-malonate is 85°–86° C. at 0.04 mm. pressure. The melting point of the 5-(1-ethoxyethyl)-5-n-butyl barbituric acid is about 138°–139° C., uncorrected.

Example 3.—Preparation of 5-(1-ethoxyethyl)-5-n-propyl barbituric acid

The 5-(1-ethoxyethyl)5-n-propyl barbituric acid is prepared in the same manner as the 5-(1-ethoxyethyl)-5-(1-methylbutyl) barbituric acid described in Example 1, except that instead of employing 115 g. of diethyl (1-methylbutyl)-malonate, 101 g. of diethyl n-propyl-malonate is used. The boiling point of the diethyl (1-ethoxyethyl)-n-propyl-malonate is 81°–82° C. at 0.03 mm. pressure. The melting point of the 5-(1-ethoxyethyl)-5-n-propyl barbituric acid is about 168.5°–169° C., uncorrected.

*Example 4.—Preparation of 5-(1-ethoxyethyl)-5-isoamyl barbituric acid*

The 5-(1-ethoxyethyl)-5-isoamyl barbituric acid is prepared in the same manner as the 5-(1-ethoxyethyl)-5-1(1-methylbutyl) barbituric acid described in Example 1, except that instead of employing 115 g. of diethyl (1-methylbutyl)-malonate, 115 g. of diethyl isoamyl-malonate is used. The boiling point of the diethyl (1-ethoxyethyl)-isoamyl-malonate is 88°–89° C. at 0.03 mm. pressure. The melting point of the 5-(1-ethoxyethyl)-5-isoamyl barbituric acid is about 136°–137° C., uncorrected.

Barbiturates may be readily obtained from the barbituric acids of this invention. These barbiturates are represented by formula 1 above with X representing an alkali metal, ammonium, monoalkyl ammonium, dialkyl ammonium, or alkanol ammonium. These barbiturates may be obtained by the reaction of the 5-(1-ethoxyethyl)-5-R-barbituric acid dissolved in a suitable solvent with either the hydroxide or ethylate of the desired metal, or with ammonia, or with the desired alkylamine or alkanolamine.

The sodium salts, for example, are represented by the following formula:

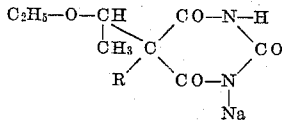

The other alkali salts have the same general formula except for the substitution of the other metals for sodium. These salts are prepared in the general way of preparing alkali metal salts from barbituric acids.

When the sodium salts are desired in a stable form sufficiently free from contaminants so that clear water solutions thereof, suitable for intravenous injection, may be obtained, they are produced by the methods disclosed in the U. S. Patent No. 1,856,792 issued to H. A. Shonle on May 3, 1932.

The ammonium and alkylamine and alkanolamine salts of 5-(1-ethoxyethyl)-5-R-barbituric acids may be produced by the reaction of these respective acids with ammonia or with the desired amine in the usual manner of producing ammonium or alkylamine or alkanolamine barbiturates. Formulas of these barbiturates correspond in general to Formula 1 above except that $NH_4$ or the proper substituted ammonium radical is substituted for hydrogen at the point of Formula 1.

What is claimed is:

1. A 5-(1-ethoxyethyl)-5-alkyl barbituric compound which is represented by the following formula:

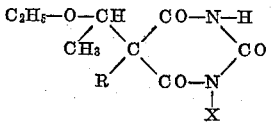

in which R is an alkyl group having more than 2 and less than 6 carbon atoms and X is a member selected from the class consisting of hydrogen, the alkali metals, the equivalents of the alkaline-earth metals, ammonium, monoalkyl ammoniums, dialkyl ammoniums, and alkanol ammoniums.

2. A sodium 5-(1-ethoxyethyl)-5-alkyl barbiturate which is represented by the following formula:

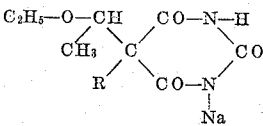

in which R is an alkyl group having more than 2 and less than 6 carbon atoms.

3. A 5-(1-ethoxyethyl)-5-alkyl barbituric acid which is represented by the following formula:

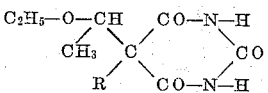

in which R is an alkyl group having more than 2 and less than 6 carbon atoms.

4. A 5-(1-ethoxyethyl) - 5 - (1 - methylbutyl) barbituric compound which is represented by the following formula:

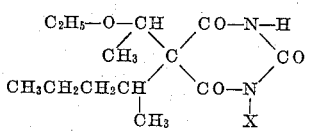

in which X is a member selected from the class consisting of hydrogen, the alkali metals, the equivalents of the alkaline-earth metals, ammonium, monoalkyl ammoniums, dialkyl ammoniums, and alkanol ammoniums.

5. Sodium 5-(1-ethoxyethyl) - 5 - (1 - methylbutyl) barbiturate.

6. 5-(1-ethoxyethyl)-5-n-butyl barbituric acid.

7. Sodium 5-(1-ethoxyethyl)-5-isoamyl barbiturate.

8. In the process of making a barbituric acid which is represented by the following general formula:

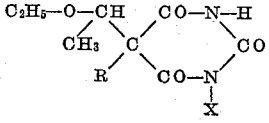

in which R is an alkyl group having more than 2 and less than 6 carbon atoms and X is a member selected from the class consisting of hydrogen, the alkali metals, the equivalents of the alkaline-earth metals, ammonium, monoalkyl ammoniums, dialkyl ammoniums, and alkanol ammoniums, the step of reacting α-chlorodiethyl ether with the sodio-derivative of a dialkyl-R malonate to produce dialkyl(1-ethoxyethyl)-R-malonate.

SAMUEL M. McELVAIN.
HOWARD BURKETT.

REFERENCES CITED

The following references are of record in the file of this patent:

UNITED STATES PATENTS

| Number | Name | Date |
|---|---|---|
| 1,217,447 | Hiemenz et al. | Feb. 27, 1917 |
| 782,739 | Fischer | Feb. 14, 1905 |
| 2,161,212 | Whitmore et al. | June 6, 1939 |

OTHER REFERENCES

Shonle et al., Journal Amer. Chem. Soc., vol. 52, page 2440 (1930). Beilstein, vol. 1, page 606. (Copy in Division 6.) Journal Amer. Chem. Soc., vol. 47, pages 3083–5 (1925). Journal Amer. Chem. Soc., vol. 48, pages 257–62 (1926), J. A. C. S. 48.